(12) United States Patent
Chi

(10) Patent No.: US 6,413,454 B1
(45) Date of Patent: Jul. 2, 2002

(54) METHOD FOR MANUFACTURING E.V.A. FOAMED SPORTS EQUIPMENT

(76) Inventor: Cheng-Hsian Chi, No. 15, Lane 22, Tung Hsing East St., Taichung (TW)

( * ) Notice: Subject to any disclaimer, the term of this patent is extended or adjusted under 35 U.S.C. 154(b) by 0 days.

(21) Appl. No.: 09/536,138

(22) Filed: Mar. 28, 2000

(51) Int. Cl.[7] .......................... B29C 44/06; B29C 49/02
(52) U.S. Cl. ....................... 264/46.4; 264/46.6; 264/51; 264/101; 264/138; 264/321; 264/571; 264/572
(58) Field of Search .................... 264/51, 572, 553, 264/321, 138, 45.1, 46.6, 46.8, 571, 46.4, 101

(56) References Cited

U.S. PATENT DOCUMENTS

| | | | |
|---|---|---|---|
| 5,141,578 A | * 8/1992 | Yang | 264/45.1 |
| 5,177,824 A | * 1/1993 | Ou | 264/55 |
| 5,221,510 A | * 6/1993 | Kassaw, Jr. et al. | 264/572 |
| 5,308,420 A | * 5/1994 | Yang | 264/45.1 |
| 5,318,645 A | * 6/1994 | Yang | 264/45.1 |
| 5,560,877 A | * 10/1996 | Yung et al. | 264/321 |
| 5,736,075 A | * 4/1998 | Lee et al. | 264/321 |
| 5,928,600 A | * 7/1999 | Chu | 264/572 |
| 5,972,257 A | * 10/1999 | Liu | 264/51 |
| 6,129,798 A | * 10/2000 | Yang | 156/79 |
| 6,238,602 B1 | * 5/2001 | Liu | 264/51 |

* cited by examiner

*Primary Examiner*—Allan R. Kuhns
(74) *Attorney, Agent, or Firm*—Connolly Bove Lodge & Hutz LLP (57) ABSTRACT

A method for manufacturing an E.V.A. foamed sports equipment includes preparing and stirring an E.V.A. foamable mixture, then integrally forming the foamable mixture into a sports equipment blank with a constantly reduced scale, the constantly reduced scaled sports equipment blank being placed in a reduced scaled heat forming mold to be heated at the temperature of 180° C., then opening the reduced scaled heat forming mold after a pre-determined period of time, the constantly reduced scaled sports equipment blank in contact with the air being expanded into a foamed sports equipment blank, then, placing the foamed sports equipment blank and ornamental strips into a constantly scaled pattern generating mold to be heat pressed and melted into a unity, the generating mold being evacuated so that the periphery of the foamed sports equipment blank is attached to the pattern generating mold so as to form a foamed sports equipment product with a precise knurl pattern being formed thereon.

13 Claims, 10 Drawing Sheets

METHOD FOR MANUFACTURING E.V.A. FOAMED SPORTS EQUIPMENT

BACKGROUND OF THE INVENTION

1. Field of the Invention

The present invention relates to a method for manufacturing an E.V.A. (Ethyl Vinyl acetate) foamed sports equipment.

2. Description of the Related Art

A conventional E.V.A. foamable mixture material in accordance with the prior art can be heated to be foamed into a product of a foamed sports equipment with a predetermined pattern. When the product of the sports equipment is foamed into the generated pattern, it has to horizontally cutting the periphery of the product and to perform a rim abrading and finishing working process so that an ornamental strip can be conveniently bonded to the product of the foamed sports equipment. However, a large amount of chips or waste material will be created during the cutting and abrading working process, thereby greatly consuming the material and increasing the cost of disposal of the waste material. In addition, it is easy to break the molded film layer of the foamed material, thereby greatly decreasing the toughness and tensile resistant strength of the product of the foamed sports equipment.

SUMMARY OF THE INVENTION

In accordance with one aspect of the present invention, there is provided a method for manufacturing an E.V.A. foamed sports equipment comprising the steps of: preparing a predetermined proportion of foamable mixture of E.V.A., a foaming agent and a cross-linking agent which are mixed and stirred, rolling or integrally forming the foamable mixture into a sports equipment blank with a constantly reduced scale, the constantly reduced scaled sports equipment blank being placed in a reduced scaled heat forming mold to be heated at a high temperature of 180° C., the constantly reduced scaled sports equipment blank being subjected to an integral heat pressing expanding action in the reduced scaled heat forming mold, opening the reduced scaled heat forming mold after a pre-determined period of time, the constantly reduced scaled sports equipment blank subjected to the heat pressing expanding action being in contact with the air to be integrally wholly expanded into a foamed sports equipment blank, the foamed sports equipment blank being slightly greater than a product structure, the foamed sports equipment blank being formed with a recess having a special pattern, then, placing the foamed sports equipment blank at a high temperature and a plurality of ornamental strips which are respectively embedded into the foamed sports equipment blank into a constantly scaled pattern generating mold to be heat pressed and melted into a unity, then, the constantly scaled pattern generating mold having a local cavity wall which connects to a vacuum pump to be evacuated by the vacuum pump so that a local periphery of the foamed sports equipment blank at a high temperature is entirely attached to the cavity wall of the constantly scaled pattern generating mold so as to integrally form a foamed sports equipment product with a precise knurl pattern formed thereon.

In accordance with another aspect of the present invention, there is provided a method for manufacturing an E.V.A. foamed sports equipment comprising the steps of: preparing a predetermined proportion of foamable mixture of E.V.A., a foaming agent and a cross-linking agent which are mixed and stirred, the E.V.A. foamable mixture being directly heated into a foam body, then the foam body being cut into a foamed sports equipment blank, the foamed sports equipment blank being slightly greater than a product structure, the foamed sports equipment blank having to be heated by a heating device before the foamed sports equipment blank is placed into a constantly scaled pattern generating mold so as to perform a pressing cooling pattern generating process in the constantly scaled pattern generating mold, the constantly scaled pattern generating mold having a cavity wall connecting to a vacuum pump to be evacuated by the vacuum pump so that the foamed sports equipment blank at a high temperature is integrally formed into a foamed sports equipment product with a precise knurl pattern formed thereon.

In accordance with a further aspect of the present invention, there is provided a method for manufacturing an E.V.A. foamed sports equipment comprising the steps of: preparing a predetermined proportion of foamable mixture of E.V.A., a foaming agent and a cross-linking agent which are mixed and stirred, the E.V.A. foamable mixture being directly heated into a hollow foamed sports equipment blank, the foamed sports equipment blank having a hollow cavity chamber and an air inlet port, then placing the foamed sports equipment blank at a high temperature into a pattern generating mold, the air being introduced into the foamed sports equipment blank at the high temperature through a blowing pipe so as to pressurize the foamed sports equipment blank, so that a peripheral surface of the foamed sports equipment blank is subjected to a pneumatic inflation action so as to tightly attach to a wall of the pattern generating mold, so that the foamed sports equipment blank at a high temperature is pressed into a foamed sports equipment product with a precise knurl pattern formed thereon.

In accordance with a further aspect of the present invention, there is provided a method for manufacturing an E.V.A. foamed sports equipment comprising the steps of: forming an E.V.A. foamable mixture into a foamed sports equipment blank with a hollow cavity chamber, the hollow cavity chamber of the foamed sports equipment blank having a wall coated with a plastic thin film layer, then, placing the foamed sports equipment blank at a high temperature into a pattern generating mold, the air being introduced into the hollow cavity chamber of the foamed sports equipment blank through a blowing pipe so as to pressurize the foamed sports equipment blank, so that a peripheral surface of the foamed sports equipment blank is subjected to a pneumatic inflation action so as to tightly attach to a wall of the pattern generating mold, so that the foamed sports equipment blank at a high temperature is pressed into a foamed sports equipment product with a precise knurl pattern formed thereon.

Further benefits and advantages of the present invention will become apparent after a careful reading of the detailed description with appropriate reference to the accompanying drawings.

DETAILED DESCRIPTION OF THE INVENTION

Figure 1:
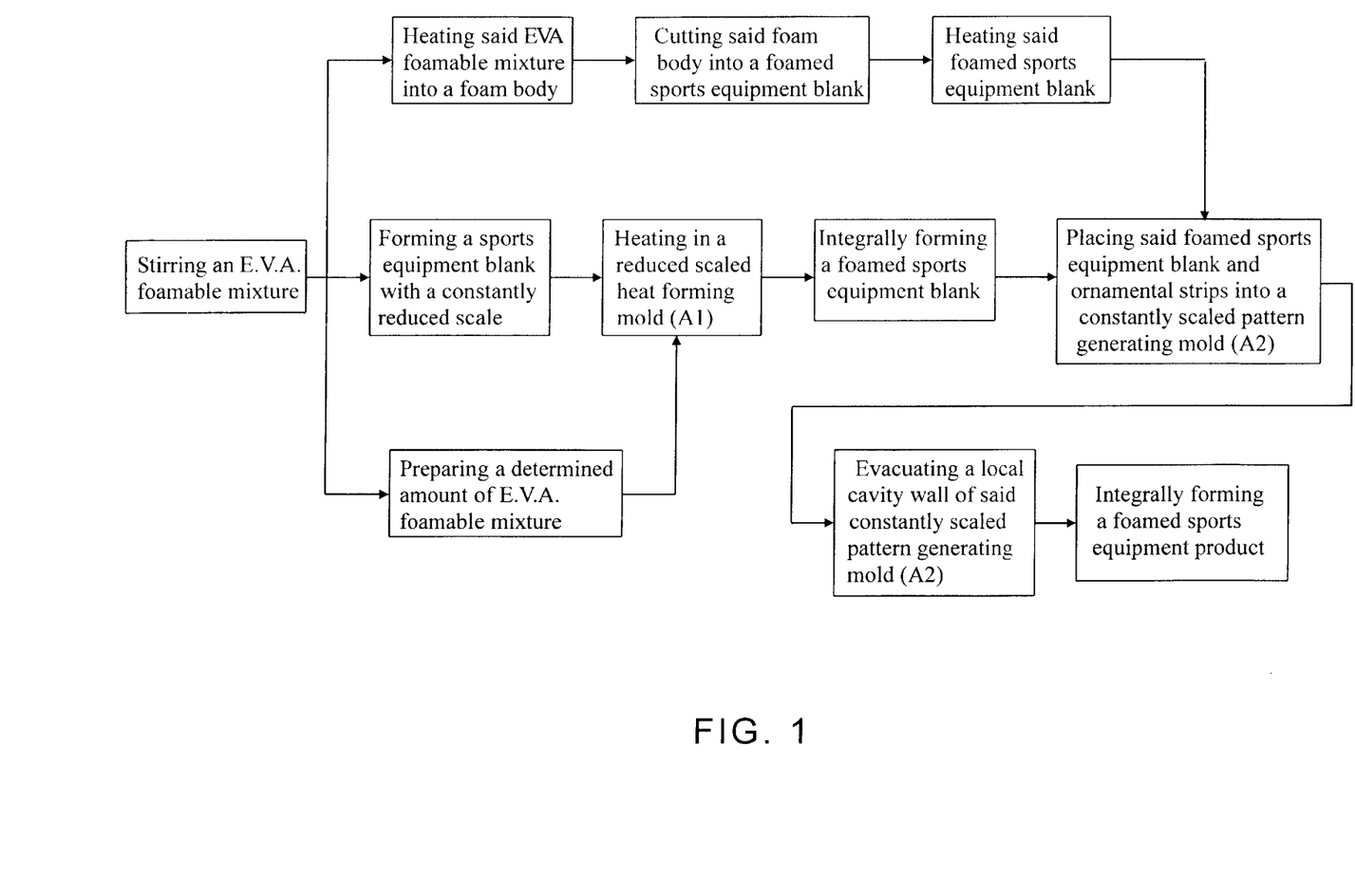
FIG. 1 is a flow chart of a method for manufacturing an E.V.A. foamed sports equipment in accordance with the present invention.
Figure 2:
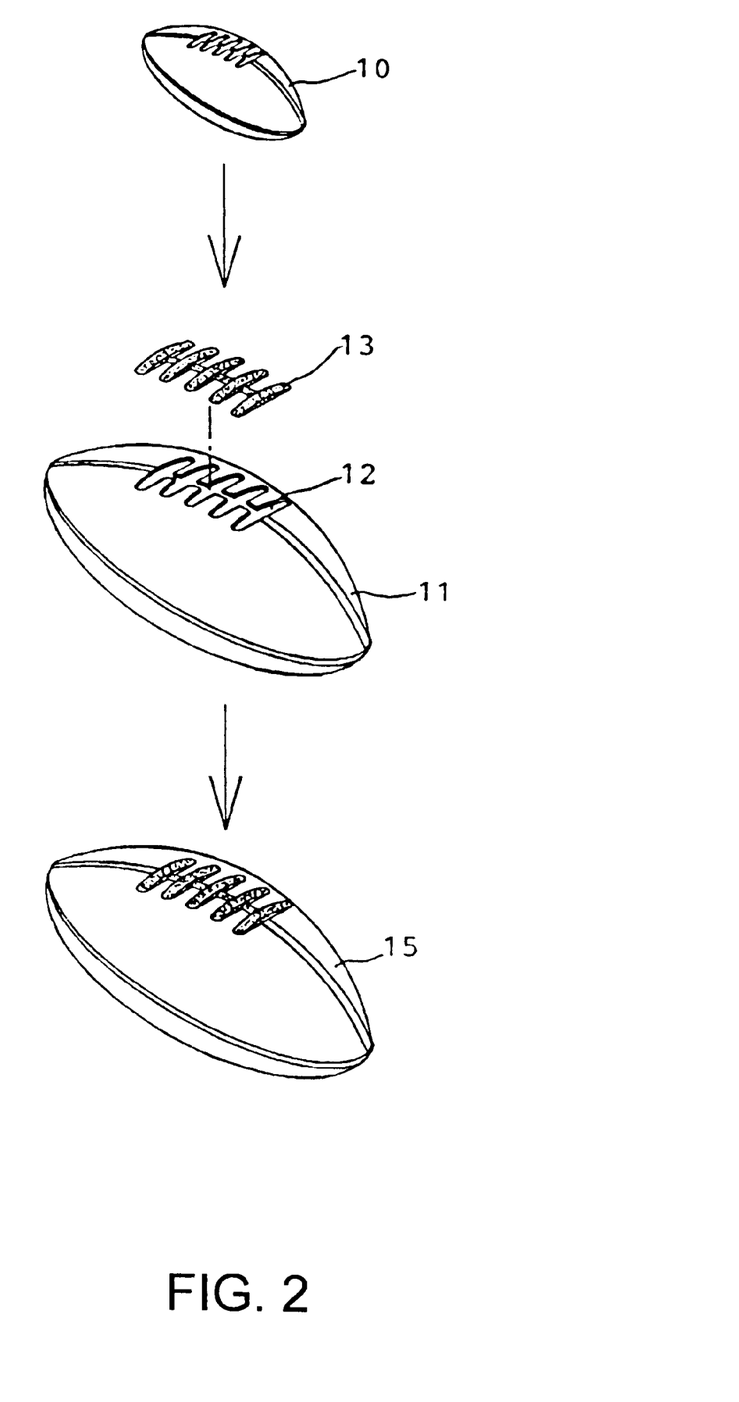
FIG. 2 is an exploded view of the E.V.A. foamed sports equipment in accordance with the present invention.
Figure 3:
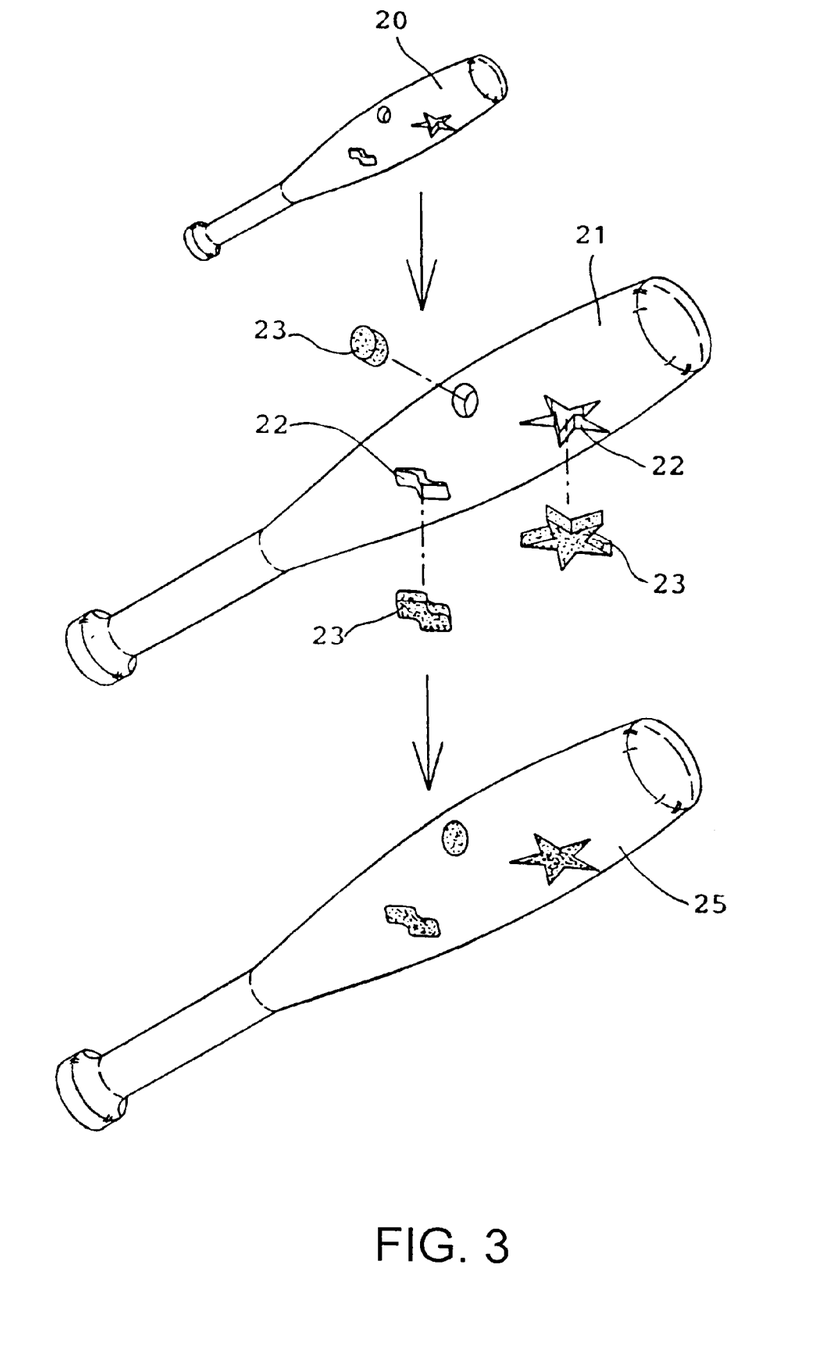
FIG. 3 is an exploded view of the E.V.A. foamed sports equipment in accordance with the present invention.
Figure 4:
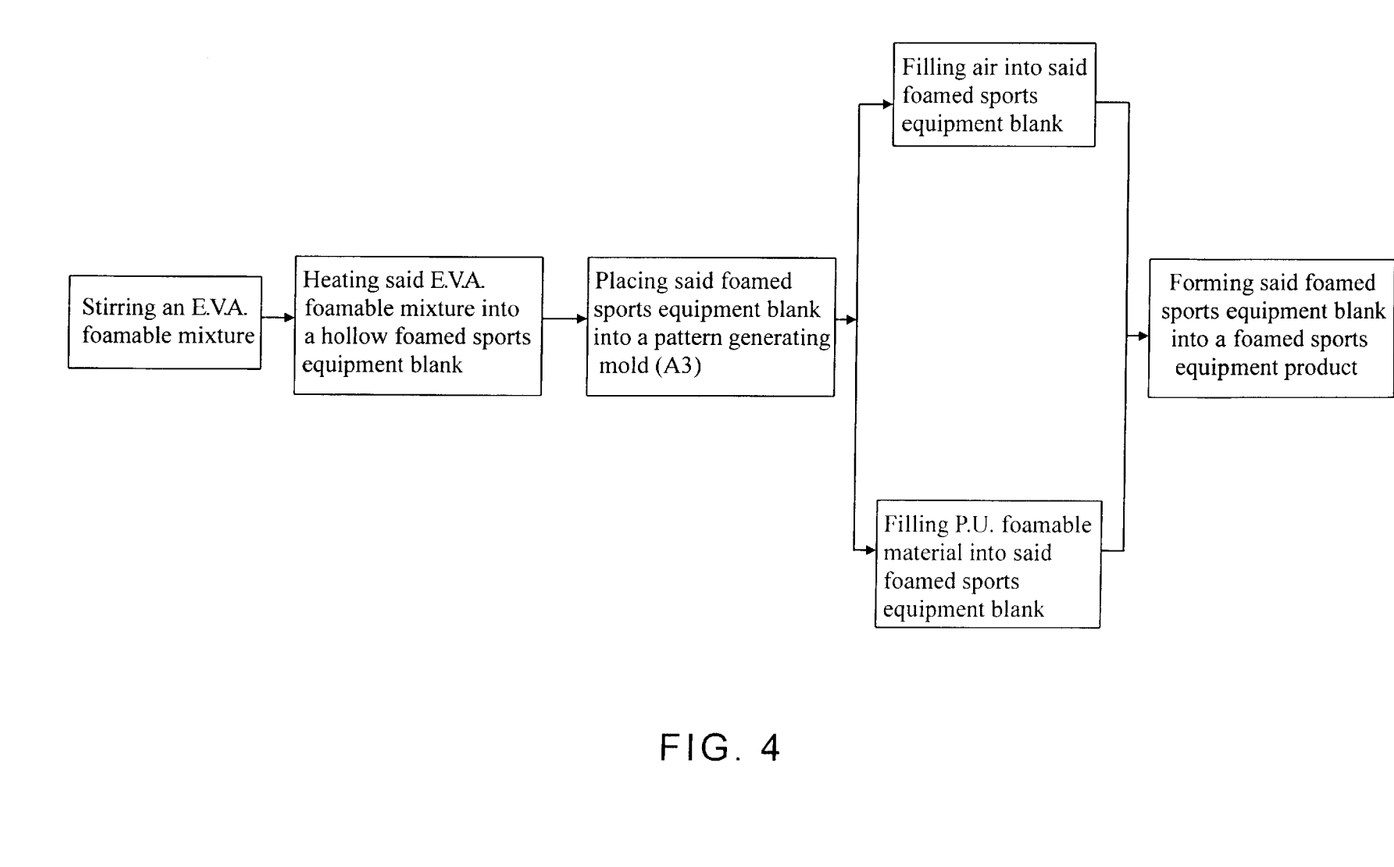
FIG. 4 is a flow chart of a method for manufacturing an E.V.A. foamed sports equipment in accordance with another embodiment of the present invention.

Referring to the drawings and initially to FIGS. 1–3, a method in accordance with the present invention is used for manufacturing an E.V.A. foamed sports equipment and comprises the following steps.

First of all, a predetermined proportion of foamable mixture of E.V.A. (ethylene vinyl acetate), a foaming agent and a cross-linking agent are mixed and stirred. Then, the foamable mixture is rolled or integrally formed into a sports equipment blank 10 or 20 with a constantly reduced scale. The constantly reduced scaled sports equipment blank 10 or 20 is placed in a reduced scaled heat forming mold A1 to be heated at a high temperature of 180° C. The constantly reduced scaled sports equipment blank 10 or 20 is then subjected to an integral heat pressing expanding action in the reduced scaled heat forming mold A1.

The reduced scaled heat forming mold A1 is then opened after a pre-determined period of time. Then, the constantly reduced scaled sports equipment blank subjected to the heat pressing expanding action is in contact with the air to be integrally wholly expanded into a foamed sports equipment blank 11 or 21, wherein the foamed sports equipment blank 11 or 21 is slightly greater than a product structure. The foamed sports equipment blank 11 or 21 is formed with a plurality of recesses 12 or 22 having a special pattern.

The foamed sports equipment blank 11 or 21 at a high temperature and a plurality of ornamental strips 13 or 23 which are respectively embedded into the foamed sports equipment blank 11 or 21 are then placed into a constantly scaled pattern generating mold A2 to be heat pressed and melted into a unity. The foamed sports equipment blank 11 or 21 placed into the constantly scaled pattern generating mold A2 can be processed by a cooling pattern generating step.

The constantly scaled pattern generating mold A2 has a local cavity wall which connects to a vacuum pump (not shown) to be evacuated by the vacuum pump so that a local periphery of the foamed sports equipment blank 11 or 21 at a high temperature is entirely attached to the cavity wall of the constantly scaled pattern generating mold A2 so as to integrally form a foamed sports equipment product 15 or 25 with a precise knurl pattern being formed thereon as shown in FIGS. 2 and 3.

The foamed sports equipment blank 11 or 21 can also be formed with a hollow cavity (not shown) whereby an article with a greater rigidity is placed in the hollow cavity so that the foamed sports equipment blank 11 or 21 and the article are heat pressed coated and melted into a unity.

Alternatively, when the foamed sports equipment products or foamed toys have a simple pattern without having to form a precise knurl pattern thereon, a determined amount of E.V.A. foamable mixture is placed into the reduced scaled heat forming mold Al to be heated at the high temperature of 180° C. so as to form a fully expanded foamed sports equipment blank 11 or 21 without having to prefabricate the constantly reduced scaled sports equipment blank 10 or 20.

Alternatively, the method for manufacturing an E.V.A. foamed sports equipment comprises the steps of: preparing a predetermined proportion of foamable mixture of E.V.A., a foaming agent and a cross-linking agent which are mixed and stirred.

The E.V.A. foamable mixture is directly heated into a foam body. Then the foam body is cut into a foamed sports equipment blank 11 or 21. The foamed sports equipment blank 11 or 21 is slightly greater than a product structure. The foamed sports equipment blank 11 or 21 has to be heated by a heating device (not shown) before the foamed sports equipment blank 11 or 21 is placed into a constantly scaled pattern generating mold A2 so as to perform a pressing cooling pattern generating process in the constantly scaled pattern generating mold A2.

The constantly scaled pattern generating mold A2 has a cavity wall connecting to a vacuum pump (not shown) so as to be evacuated by the vacuum pump so that the foamed sports equipment blank 11 or 21 at a high temperature is integrally formed into a foamed sports equipment product 15 or 25 with a precise knurl pattern being formed thereon.

In such a manner, it is unnecessary to prefabricate the constantly reduced scaled sports equipment blank 10 or 20, and to provide the reduced scaled heat forming mold A1.

Figure 5:
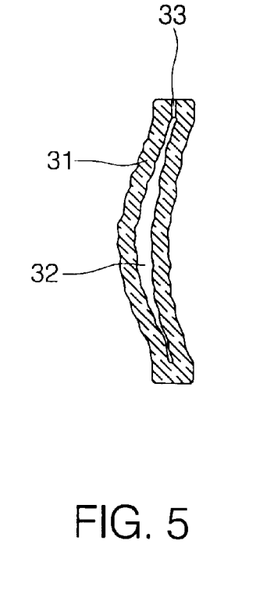
FIG. 5 is a front plan view of the E.V.A. foamed sports equipment in accordance with another embodiment of the present invention.
Figure 6:
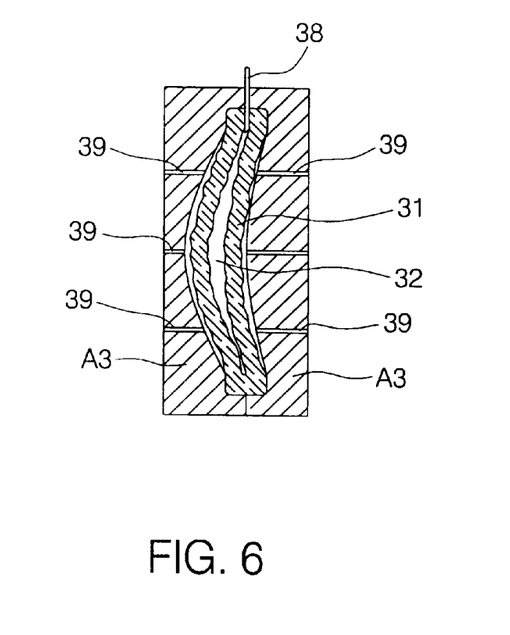
FIG. 6 is a front plan cross-sectional assembly view showing the E.V.A. foamed sports equipment being placed into a pattern generating mold.

Referring to FIGS. 4–8, in accordance with another embodiment of the present invention, the method for manufacturing an E.V.A. foamed sports equipment comprises the steps of: preparing a predetermined proportion of foamable mixture of E.V.A., a foaming agent and a cross-linking agent which are mixed and stirred. The E.V.A. foamable mixture is directly heated into a hollow foamed sports equipment blank 31 which includes a hollow cavity chamber 32 and an air inlet port 33 as shown in FIG. 5. Then, the foamed sports equipment blank 31 at a high temperature is placed into a pattern generating mold A3 as shown in FIG. 6.

Figure 7:
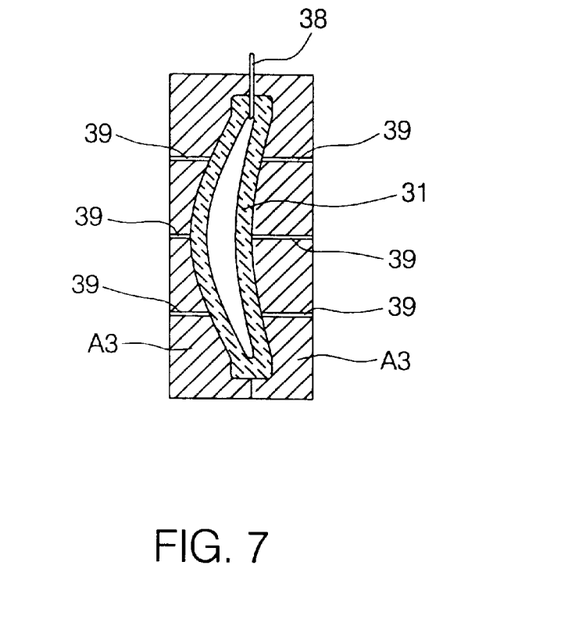
FIG. 7 is an operational view of the E.V.A. foamed sports equipment as shown in FIG. 6.
Figure 8:
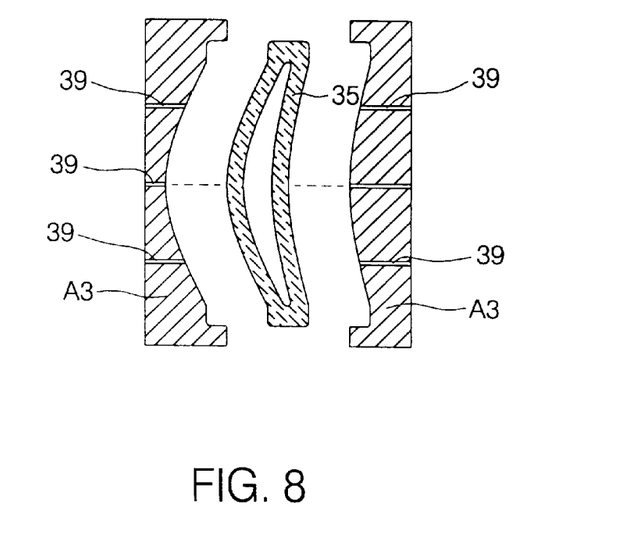
FIG. 8 is an operational view of the E.V.A. foamed sports equipment as shown in FIG. 7.

The air is then introduced into the foamed sports equipment blank 31 at a high temperature through a blowing pipe 38 so as to pressurize the foamed sports equipment blank 31, so that a peripheral surface of the foamed sports equipment blank 31 is subjected to a pneumatic inflation action so as to tightly attach to a wall of the pattern generating mold A3 as shown in FIG. 7, so that the foamed sports equipment blank 31 at a high temperature is pressed into a foamed sports equipment product 35 with a precise knurl pattern being formed thereon as shown in FIG. 8.

The pattern generating mold A3 includes a cavity wall locally defining a plurality of ventilating pores 39. As shown in FIGS. 5 and 8, the air inlet port 33 of the foamed sports equipment blank 31 at a high temperature is melted to be sealed after the foamed sports equipment blank 31 is filled with air.

Alternatively, the cavity chamber 32 of the foamed sports equipment blank 31 at a high temperature is filled with a fluid P.U. (polyurethane) thermoplastic foamable material (not shown) which can be expanded and foamed in the cavity chamber 32 of the foamed sports equipment blank 31.

Figure 9:
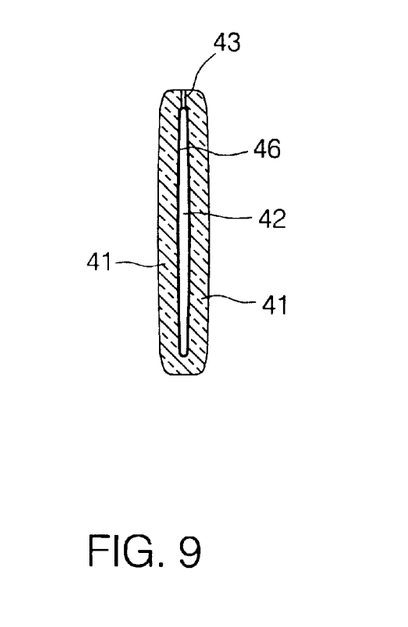
FIG. 9 is a front plan cross-sectional view of an E.V.A. foamed sports equipment in accordance with a further embodiment of the present invention.

Referring to FIGS. 9–12, in accordance with a further embodiment of the present invention, the method for manufacturing an E.V.A. foamed sports equipment comprises the steps of: forming an E.V.A. foamable mixture into a foamed sports equipment blank 41 with a hollow cavity chamber 42. The hollow cavity chamber 42 of the foamed sports equipment blank 41 has a wall coated with a plastic thin film layer 46 as shown in FIG. 9.

Figure 10:
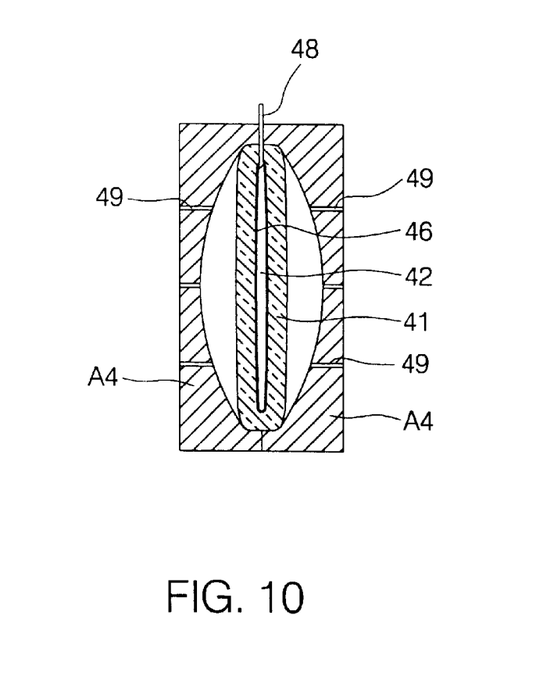
FIG. 10 is a front plan cross-sectional assembly view showing the E.V.A. foamed sports equipment being placed into a pattern generating mold.
Figure 11:
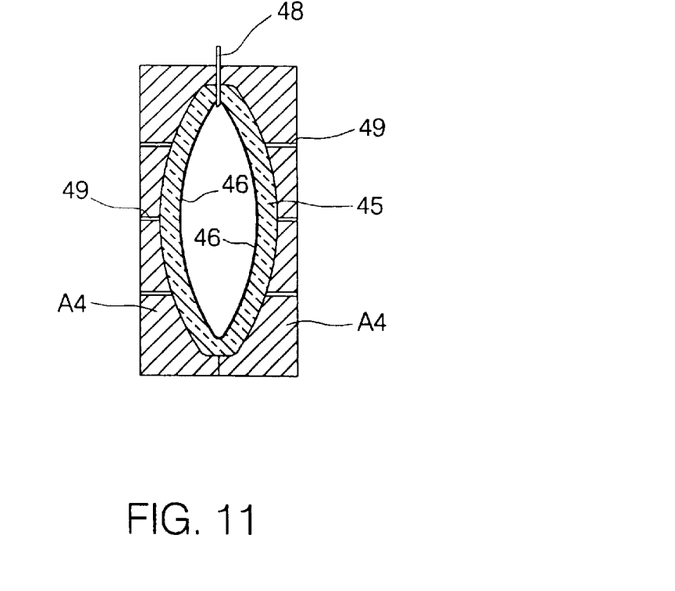
FIG. 11 is an operational view of the E.V.A. foamed sports equipment as shown in FIG. 10.
Figure 12:
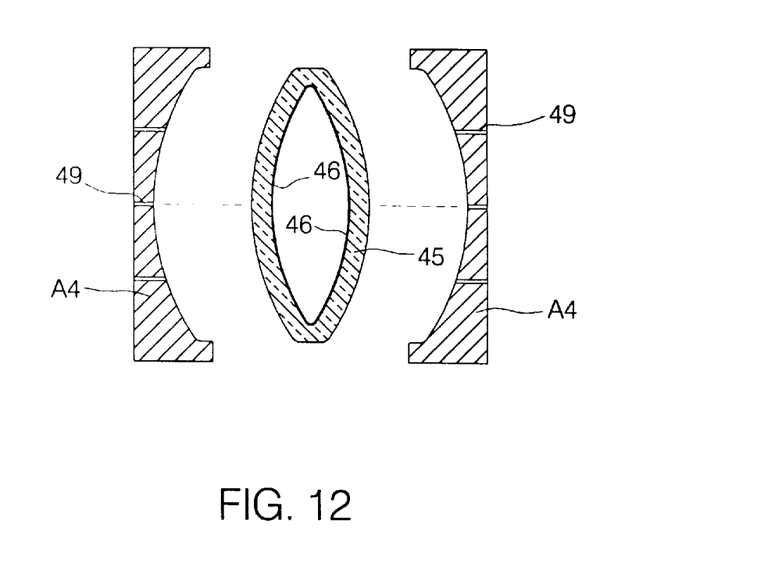
FIG. 12 is an operational view of the E.V.A. foamed sports equipment as shown in FIG. 11.

Then, the foamed sports equipment blank 41 at a high temperature is placed into a pattern generating mold A4 as shown in FIG. 10. The air is then introduced into the hollow cavity chamber 42 of the foamed sports equipment blank 41 through a blowing pipe 48 so as to pressurize the foamed sports equipment blank 41, so that the peripheral surface of the foamed sports equipment blank 41 is subjected to a pneumatic inflation action so as to tightly attach to a wall of the pattern generating mold A4 as shown in FIG. 11, so that the foamed sports equipment blank 41 at a high temperature is pressed into a foamed sports equipment product 45 as shown in FIG. 12 with a precise knurl pattern and an air cell being formed thereon.

The pattern generating mold A4 includes a cavity wall locally defining a plurality of ventilating pores 49. As shown in FIGS. 9 and 12, the air inlet port 43 of the foamed sports equipment blank 41 at a high temperature is melted to be sealed after the foamed sports equipment blank 41 is filled with air.

Figure 13:
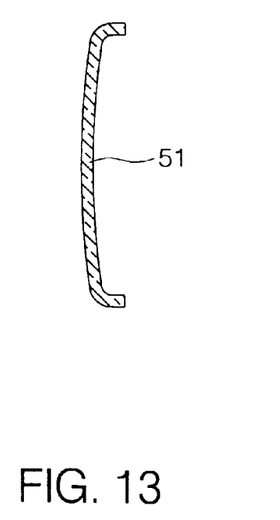
FIG. 13 is a front plan cross-sectional view of an E.V.A. foamed sports equipment in accordance with a further embodiment of the present invention.
Figure 14:
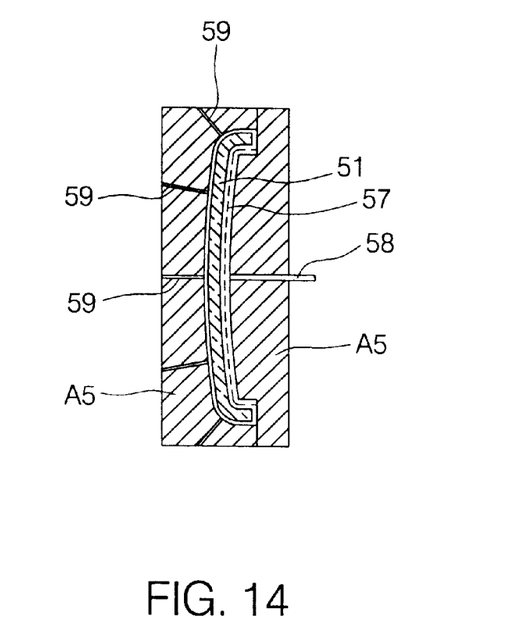
FIG. 14 is a front plan cross-sectional assembly view showing the E.V.A. foamed sports equipment being placed into a pattern generating mold.

Referring to FIGS. 13–16, in accordance with a further embodiment of the present invention, the method for manufacturing an E.V.A. foamed sports equipment comprises the steps of: forming an E.V.A. foamable mixture into a foamed sports equipment blank 51 as shown in FIG. 13. Then, the foamed sports equipment blank 51 at a high temperature is placed into a pattern generating mold A5 as shown in FIG. 14.

Figure 15:
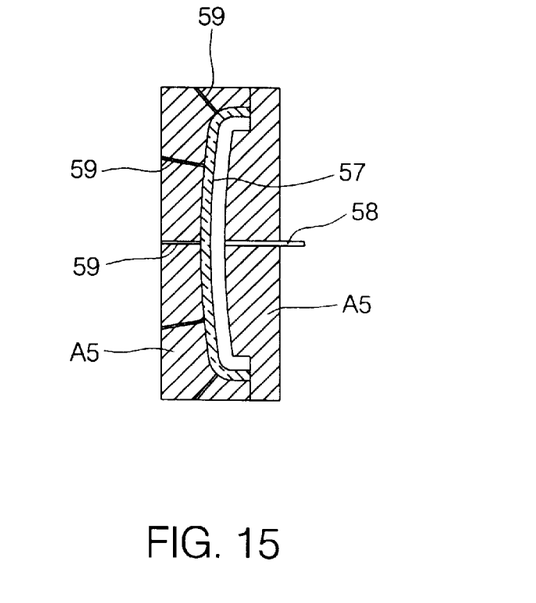
FIG. 15 is an operational view of the E.V.A. foamed sports equipment as shown in FIG. 14.
Figure 16:
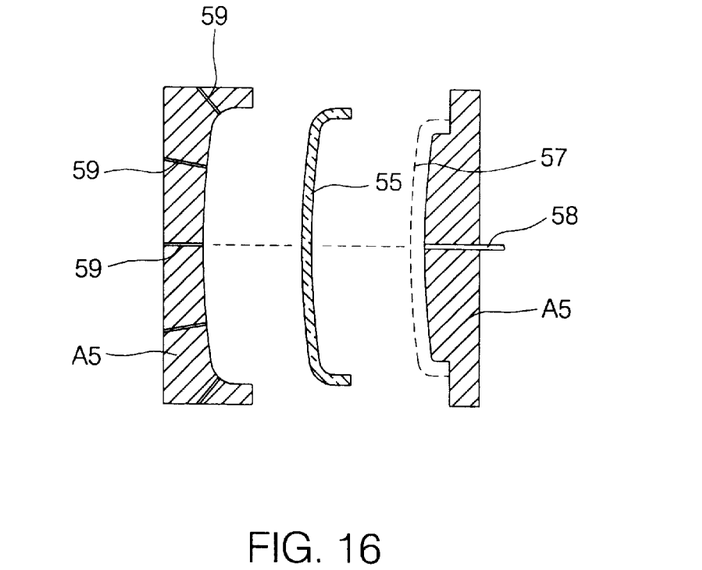
FIG. 16 is an operational view of the E.V.A. foamed sports equipment as shown in FIG. 15.

The pattern generating mold A5 includes a cavity wall having one side mounted with an air cell 57 which is filled with air and pressurized by a blowing pipe 58 so as to pressurize the foamed sports equipment blank 51, so that a peripheral surface of the foamed sports equipment blank 51 is tightly attached to the other side of the cavity wall of the pattern generating mold A5 as shown in FIG. 15, so that the foamed sports equipment blank 51 at a high temperature is pressed into a foamed sports equipment product 55 as shown in FIG. 16 with a precise knurl pattern being formed thereon. The other side of the cavity wall of the pattern generating mold A5 also defines a plurality of ventilating pores 59.

The method in accordance with the present invention can also be used for manufacturing a common foamed sports equipment or toy such as a flight disk, sports hat, floating board, protective pad, glove or the like.

Accordingly, the method in accordance with the present invention can be adapted to enhance the structural strength of the entire E.V.A. foamed sports equipment. In addition, the method can also be adapted to adjust the manufacturing equipment and the process according to the requirements of quality and precision for the E.V.A. foamed sports equipment, thereby greatly decreasing the cost and time of fabrication.

It should be clear to those skilled in the art that further embodiments may be made without departing from the scope of the present invention.

What is claimed is:

1. A method for manufacturing an E.V.A. foamed sports equipment comprising the steps of: preparing a predetermined proportion of foamable mixture of E.V.A. a foaming agent and a cross-linking agent which are mixed and stirred rolling or integrally forming said foamable mixture into a sports equipment blank with a constantly reduced scale, said constantly reduced scaled sports equipment blank being placed in a reduced scaled heat forming mold (A1) and being heated at a high temperature of 180° C., said constantly reduced scaled sports equipment blank being subjected to an integral heat pressing expanding action in said reduced scaled heat forming mold (A1), opening said reduced scaled heat forming mold (A1) after a pre-determined period of time, said constantly reduced scaled sports equipment blank subjected to said heat pressing expanding action being in contact with air and being integrally wholly expanded into a foamed sports equipment blank said foamed sports equipment blank having a size slightly greater than a product structure, said foamed sports equipment blank being formed with a recess having a special pattern, then, placing said foamed sports equipment blank at a high temperature and a plurality of ornamental strips which are respectively embedded into said foamed sports equipment blank into a constantly scaled pattern generating mold (A2) so that said foamed sports equipment blank and said ornamental strips are heat pressed and melted into a unity, then said constantly scaled pattern generating mold (A2) having a local cavity wall which connects to a vacuum pump is evacuated by said vacuum pump so that a local periphery of said foamed sports equipment blank at a high temperature is entirely attached to said cavity wall of said constantly scaled pattern generating mold (A2) so as to integrally form a foamed sports equipment product with a precise knurl pattern formed thereon.

2. The method in accordance with claim 1, wherein said foamed sports equipment blank is formed with a hollow cavity whereby an article with a greater rigidity is placed in said hollow cavity so that said foamed sports equipment blank and said article are heat pressed coated and melted into a unity.

3. The method in accordance with claim 1, wherein a determined amount of E.V.A. foamable mixture is placed into said reduced scaled heat forming mold (A1) and is heated at a high temperature of 180° C. so as to form a fully expanded foamed sports equipment blank.

4. The method in accordance with claim 3, wherein said foamed sports equipment blank is placed into a constantly scaled pattern generating mold to be processed by a cooling pattern generating step.

5. A method for manufacturing an E.V.A. foamed sports equipment comprising the steps of preparing a predetermined proportion of foamable mixture of E.V.A., a foaming agent and a cross-linking agent which are mixed and stirred, said E.V.A. foamable mixture being directly heated into a foam body, then said foam body being cut into a foamed sports equipment blank, said foamed sports equipment blank having a size slightly greater than a product structure, said foamed sports equipment blank being heated by a heating device before said foamed sports equipment blank is placed into a constantly scaled pattern generating mold (A2) so as to perform a pressing cooling pattern generating process in said constantly scaled pattern generating mold (A2), said constantly scaled pattern generating mold (A2) having a cavity wall connecting to a vacuum pump and being evacuated by said vacuum pump so that said foamed sports equipment blank at a high temperature is integrally formed into a foamed sports equipment product with a precise knurl pattern formed thereon.

6. A method for manufacturing an E.V.A foamed sport equipment comprising the steps of: preparing a predetermined proportion of foamable mixture of E.V.A., a foaming agent and a cross-linking agent which are mixed and stirred, said E.V.A. foamable mixture being directly heated into a hollow foamed sports equipment blank, said foamed sports equipment blank having a hollow cavity chamber and an air inlet port, then placing said foamed sports equipment blank at a high temperature into a pattern generating mold (A3), air being introduced into said foamed sports equipment blank at the high temperature through a blowing pipe so as to pressurize said foamed sports equipment blank, so that a peripheral surface of said foamed sports equipment blank is subjected to a pneumatic inflation action so as to tightly attach to a wall of said pattern generating mold (A3), so that said foamed sports equipment blank at a high temperature is pressed into a foamed sports equipment product with a precise knurl pattern formed thereon.

7. The method in accordance with claim 6, wherein said pattern generating mold (A3) includes a cavity wall locally defining a plurality of ventilating pores.

8. The method in accordance with claim 6, wherein said air inlet port of said foamed sports equipment blank at a high temperature is melted to be sealed after said foamed sports equipment blank is filled with air.

9. The method in accordance with claim 6, wherein said cavity chamber of said foamed sports equipment blank at a high temperature is filled with a fluid P.U. thermoplastic foamable material whereby said fluid P.U. thermoplastic foamable material is expanded and foamed in said cavity chamber of said foamed sports equipment blank.

10. A method for manufacturing an E.V.A. foamed sports equipment comprising the steps of: forming an E.V.A. foamable mixture into a foamed sports equipment blank with a hollow cavity chamber, said hollow cavity chamber of said foamed sports equipment blank having a wall coated with a plastic thin film layer, then, placing said foamed sports equipment blank at a high temperature into a pattern generating mold (A4), air being introduced into said hollow cavity chamber of said foamed sports equipment blank through a blowing pipe so as to pressurize said foamed sports equipment blank, so that a peripheral surface of said foamed sports equipment blank is subjected to a pneumatic inflation action so as to tightly attach to a wall of said pattern generating mold (A4), so that said foamed sports equipment blank at a high temperature is pressed into a foamed sports equipment product with a precise knurl pattern formed thereon.

11. The method in accordance with claim 10, wherein said pattern generating mold (A4) includes a cavity wall locally defining a plurality of ventilating pores.

12. The method in accordance with claim 10, wherein said inlet port of said foamed sports equipment blank at a high temperature is melted and is sealed after said foamed sports equipment blank is filled with air.

13. The method in accordance with claim 10, wherein said pattern generating mold includes a cavity wall having one side mounted with an air cell which is filled with air and pressurized by a blowing pipe.

* * * * *